(12) United States Patent
Trese et al.

(10) Patent No.: US 12,387,034 B2
(45) Date of Patent: Aug. 12, 2025

(54) SYSTEMS AND METHODS OF DOCUMENT REVIEW, MODIFICATION AND PERMISSION-BASED CONTROL

(71) Applicant: SDL Inc., Wakefield, MA (US)

(72) Inventors: Andrew Trese, Somerville, MA (US); Frank Closset, Sint-Truiden (BE); Laurens van den Oever, Vlaardingen (NL)

(73) Assignee: SDL Inc., Wakefield, MA (US)

( * ) Notice: Subject to any disclaimer, the term of this patent is extended or adjusted under 35 U.S.C. 154(b) by 0 days.

(21) Appl. No.: 18/224,533

(22) Filed: Jul. 20, 2023

(65) Prior Publication Data

US 2023/0359809 A1 Nov. 9, 2023

Related U.S. Application Data

(63) Continuation of application No. 17/584,217, filed on Jan. 25, 2022, now Pat. No. 11,775,738, which is a
(Continued)

(51) Int. Cl.
*G06F 40/166* (2020.01)
*G06F 16/93* (2019.01)
(Continued)

(52) U.S. Cl.
CPC ............ *G06F 40/166* (2020.01); *G06F 16/93* (2019.01); *G06F 16/9577* (2019.01);
(Continued)

(58) Field of Classification Search
CPC .................................................... G06F 40/166
See application file for complete search history.

(56) References Cited

U.S. PATENT DOCUMENTS 5,032,979 A 7/1991 Hecht et al.
5,175,684 A 12/1992 Chong
(Continued)

FOREIGN PATENT DOCUMENTS

JP 2008026971 A 2/2008

OTHER PUBLICATIONS

Dunlap et al., "ReVirt: Enabling Intrusion Analysis through Virtual-Machine Logging and Replay", Dec. 11, 2002, USENIX Association, 14 pages.
(Continued)

*Primary Examiner* — James J Debrow
(74) *Attorney, Agent, or Firm* — Carr & Ferrell LLP

(57) ABSTRACT

Systems, methods, and media for document review, modification and permission-based control are described. An exemplary non-transitory computer-readable storage medium may embody certain instructions, which when executed by at least one processor, perform steps of a method. The method may include receiving a request to review a document, responsive to the request, retrieving the document, the document including source content in an extensible markup language format, the document having a read-only access file permission, converting the document to read-write access file permission such that the source content is modifiable, receiving a modification of the source content of the document, incorporating the modification of the source content into the document to create a modified document, and automatically providing the modified document in a displayable format via the web-based interface.

20 Claims, 4 Drawing Sheets

Related U.S. Application Data continuation of application No. 16/737,892, filed on Jan. 8, 2020, now Pat. No. 11,263,390, which is a continuation of application No. 15/938,288, filed on Mar. 28, 2018, now Pat. No. 10,599,757, which is a continuation of application No. 13/217,122, filed on Aug. 24, 2011, now Pat. No. 9,984,054.

(51) Int. Cl.
*G06F 16/957* (2019.01)
*G06F 21/60* (2013.01)
*G06F 40/197* (2020.01)

(52) U.S. Cl.
CPC ............ *G06F 21/60* (2013.01); *G06F 40/197* (2020.01); *G06F 2221/2145* (2013.01)

(56) References Cited

U.S. PATENT DOCUMENTS

| | | | |
|---|---|---|---|
| 5,408,410 A | 4/1995 | Kaji | |
| 5,677,835 A | 10/1997 | Carbonell et al. | |
| 5,768,603 A | 6/1998 | Brown et al. | |
| 5,890,177 A | 3/1999 | Moody et al. | |
| 6,014,628 A | 1/2000 | Kovarik, Jr. | |
| 6,347,316 B1 | 2/2002 | Redpath | |
| 6,598,046 B1 | 7/2003 | Goldberg et al. | |
| 6,745,176 B2 | 6/2004 | Probert, Jr. et al. | |
| 6,833,848 B1 | 12/2004 | Wolff et al. | |
| 7,007,088 B1 | 2/2006 | Najmi | |
| 7,171,348 B2 | 1/2007 | Scanlan | |
| 7,194,403 B2 | 3/2007 | Okura et al. | |
| 7,200,550 B2 | 4/2007 | Menezes et al. | |
| 7,219,123 B1 | 5/2007 | Fiechter et al. | |
| 7,242,988 B1 | 7/2007 | Hoffberg et al. | |
| 7,349,845 B2 | 3/2008 | Coffman et al. | |
| 7,552,053 B2 | 6/2009 | Gao et al. | |
| 7,822,596 B2 | 10/2010 | Elgazzar et al. | |
| 7,966,556 B1 | 6/2011 | Bourdev | |
| 7,974,976 B2 | 7/2011 | Yahia et al. | |
| 8,219,382 B2 | 7/2012 | Kim et al. | |
| 8,244,519 B2 | 8/2012 | Bicici et al. | |
| 8,249,854 B2 | 8/2012 | Nikitin et al. | |
| 8,326,598 B1 | 12/2012 | Macherey et al. | |
| 8,341,734 B1 | 12/2012 | Hernacki et al. | |
| 8,380,486 B2 | 2/2013 | Soricut et al. | |
| 8,464,148 B1 | 6/2013 | Wichary | |
| 8,548,995 B1 | 10/2013 | Curtiss | |
| 8,676,563 B2 | 3/2014 | Soricut et al. | |
| 8,843,482 B2 | 9/2014 | Buriano et al. | |
| 8,990,064 B2 | 3/2015 | Marcu et al. | |
| 9,208,509 B1 | 12/2015 | Curran et al. | |
| 9,471,563 B2 | 10/2016 | Trese | |
| 9,984,054 B2 | 5/2018 | Trese et al. | |
| 10,140,320 B2 | 11/2018 | Trese et al. | |
| 10,417,646 B2 | 9/2019 | Soricut et al. | |
| 10,599,757 B2 | 3/2020 | Trese et al. | |
| 11,263,390 B2 | 3/2022 | Trese et al. | |
| 11,366,792 B2 | 6/2022 | Trese et al. | |
| 11,775,738 B2 | 10/2023 | Trese et al. | |
| 11,886,402 B2 | 1/2024 | Trese et al. | |
| 12,222,912 B2 | 2/2025 | Trese et al. | |
| 2001/0027460 A1 | 10/2001 | Yamamoto et al. | |
| 2001/0029455 A1 | 10/2001 | Chin et al. | |
| 2002/0042790 A1 | 4/2002 | Nagahara | |
| 2002/0143537 A1 | 10/2002 | Ozawa et al. | |
| 2002/0143783 A1 | 10/2002 | Bakalash et al. | |
| 2002/0165724 A1 | 11/2002 | Blankesteijn | |
| 2003/0040899 A1 | 2/2003 | Ogilvie | |
| 2003/0046056 A1 | 3/2003 | Godoy et al. | |
| 2004/0006585 A1 | 1/2004 | Paulus et al. | |
| 2004/0006744 A1 | 1/2004 | Jones et al. | |
| 2004/0064552 A1 | 4/2004 | Chong et al. | |
| 2004/0085354 A1 | 5/2004 | Massand | |
| 2004/0088647 A1 | 5/2004 | Miller et al. | |
| 2004/0167768 A1 | 8/2004 | Travieso et al. | |
| 2004/0205656 A1 | 10/2004 | Reulein et al. | |
| 2005/0021322 A1 | 1/2005 | Richardson et al. | |
| 2005/0055217 A1 | 3/2005 | Sumita et al. | |
| 2005/0055630 A1 | 3/2005 | Scanlan | |
| 2005/0086226 A1 | 4/2005 | Krachman | |
| 2005/0177358 A1 | 8/2005 | Melomed et al. | |
| 2005/0187809 A1 | 8/2005 | Falkenhainer | |
| 2005/0289187 A1 | 12/2005 | Wong et al. | |
| 2006/0031225 A1 | 2/2006 | Palmeri et al. | |
| 2006/0036448 A1 | 2/2006 | Haynie et al. | |
| 2006/0068913 A1 | 3/2006 | Walker et al. | |
| 2006/0136824 A1 | 6/2006 | Lin | |
| 2006/0155716 A1 | 7/2006 | Vasishth et al. | |
| 2006/0184410 A1 | 8/2006 | Ramamurthy et al. | |
| 2006/0212270 A1 | 9/2006 | Shiu et al. | |
| 2006/0247983 A1 | 11/2006 | Dall | |
| 2006/0248084 A1 | 11/2006 | Sack et al. | |
| 2007/0033654 A1 | 2/2007 | Wilson | |
| 2007/0043553 A1 | 2/2007 | Dolan | |
| 2007/0073544 A1 | 3/2007 | Millett et al. | |
| 2007/0078845 A1 | 4/2007 | Scott et al. | |
| 2007/0106633 A1 | 5/2007 | Reiner | |
| 2007/0112851 A1 | 5/2007 | Tomic et al. | |
| 2007/0136065 A1 | 6/2007 | Chiu et al. | |
| 2007/0136284 A1 | 6/2007 | Cobb et al. | |
| 2007/0188657 A1 | 8/2007 | Basson et al. | |
| 2007/0198245 A1 | 8/2007 | Kamatani et al. | |
| 2007/0199047 A1 | 8/2007 | Gilbart et al. | |
| 2007/0203778 A1 | 8/2007 | Lowson et al. | |
| 2007/0208719 A1 | 9/2007 | Tran | |
| 2007/0211071 A1 | 9/2007 | Slotznick et al. | |
| 2007/0219774 A1 | 9/2007 | Quirk et al. | |
| 2007/0220010 A1 | 9/2007 | Ertugrul | |
| 2007/0233547 A1 | 10/2007 | Younger et al. | |
| 2007/0294076 A1 | 12/2007 | Shore et al. | |
| 2007/0294080 A1 | 12/2007 | Bangalore | |
| 2007/0297577 A1 | 12/2007 | Wyss | |
| 2008/0005670 A1 | 1/2008 | Pravetz et al. | |
| 2008/0040095 A1 | 2/2008 | Sinha et al. | |
| 2008/0040635 A1 | 2/2008 | Larcheveque et al. | |
| 2008/0065478 A1 | 3/2008 | Kohlmeier et al. | |
| 2008/0077391 A1 | 3/2008 | Chino et al. | |
| 2008/0077392 A1 | 3/2008 | Kamatani et al. | |
| 2008/0088437 A1 | 4/2008 | Aninye et al. | |
| 2008/0102433 A1 | 5/2008 | Rogers et al. | |
| 2008/0133245 A1 | 6/2008 | Proulx et al. | |
| 2008/0134018 A1 | 6/2008 | Kembel et al. | |
| 2008/0159495 A1 | 7/2008 | Dahan | |
| 2008/0183758 A1 | 7/2008 | Kennedy | |
| 2008/0195372 A1 | 8/2008 | Chin et al. | |
| 2008/0200225 A1 | 8/2008 | Walker et al. | |
| 2008/0208587 A1 | 8/2008 | Ben-David et al. | |
| 2008/0254430 A1 | 10/2008 | Woolf et al. | |
| 2008/0254433 A1 | 10/2008 | Woolf et al. | |
| 2008/0270112 A1 | 10/2008 | Shimohata | |
| 2008/0270142 A1 | 10/2008 | Srinivasan et al. | |
| 2008/0281578 A1 | 11/2008 | Kumaran et al. | |
| 2008/0297599 A1 | 12/2008 | Donovan et al. | |
| 2009/0013162 A1* | 1/2009 | Nandan et al. | G06F 9/24 |
| 2009/0024595 A1 | 1/2009 | Chen | |
| 2009/0048821 A1 | 2/2009 | Yam et al. | |
| 2009/0076792 A1 | 3/2009 | Lawson-Tancred | |
| 2009/0094245 A1 | 4/2009 | Kerns et al. | |
| 2009/0125497 A1 | 5/2009 | Jiang et al. | |
| 2009/0222257 A1 | 9/2009 | Sumita et al. | |
| 2009/0234634 A1 | 9/2009 | Chen et al. | |
| 2009/0234635 A1 | 9/2009 | Bhatt et al. | |
| 2009/0271283 A1 | 10/2009 | Fosnacht et al. | |
| 2009/0300474 A1 | 12/2009 | Asplund et al. | |
| 2009/0327294 A1 | 12/2009 | Bailor et al. | |
| 2010/0115284 A1 | 5/2010 | Hahn et al. | |
| 2010/0138213 A1 | 6/2010 | Bicici et al. | |
| 2010/0161643 A1 | 6/2010 | Gionis et al. | |
| 2010/0185648 A1 | 7/2010 | Chauhan et al. | |
| 2010/0185693 A1 | 7/2010 | Murty et al. | |
| 2010/0257457 A1 | 10/2010 | De Goes | |
| 2010/0313250 A1 | 12/2010 | Chow | |
| 2011/0029300 A1 | 2/2011 | Marcu et al. | |

(56) References Cited

U.S. PATENT DOCUMENTS

| | | |
|---|---|---|
| 2011/0066643 A1 | 3/2011 | Cooper et al. |
| 2011/0077933 A1 | 3/2011 | Miyamoto et al. |
| 2011/0082683 A1 | 4/2011 | Soricut et al. |
| 2011/0082684 A1 | 4/2011 | Soricut et al. |
| 2011/0087680 A1 | 4/2011 | Murdock et al. |
| 2011/0137636 A1 | 6/2011 | Srihari et al. |
| 2011/0209047 A1 | 8/2011 | Olsen et al. |
| 2011/0225104 A1 | 9/2011 | Soricut et al. |
| 2011/0282648 A1 | 11/2011 | Sarikaya et al. |
| 2011/0321054 A1 | 12/2011 | Chetlur et al. |
| 2012/0005156 A1 | 1/2012 | Grant et al. |
| 2012/0078609 A1 | 3/2012 | Chaturvedi et al. |
| 2012/0185759 A1* | 7/2012 | Balinsky et al. ....... G06F 17/24 |
| 2012/0221319 A1 | 8/2012 | Trese |
| 2012/0221593 A1 | 8/2012 | Trese et al. |
| 2012/0233543 A1 | 9/2012 | Vagell et al. |
| 2012/0259583 A1 | 10/2012 | Noboa et al. |
| 2012/0271828 A1 | 10/2012 | Raghunath |
| 2012/0296914 A1 | 11/2012 | Romanov et al. |
| 2013/0055074 A1* | 2/2013 | Trese et al. ............. G06F 17/24 |
| 2013/0117376 A1 | 5/2013 | Filman et al. |
| 2013/0144605 A1 | 6/2013 | Brager et al. |
| 2013/0325833 A1 | 12/2013 | Guan et al. |
| 2013/0339847 A1 | 12/2013 | Bartek |
| 2014/0114642 A1 | 4/2014 | van den Oever et al. |
| 2014/0289702 A1 | 9/2014 | McMahon et al. |
| 2014/0304830 A1 | 10/2014 | Gammon |
| 2014/0344005 A1 | 11/2014 | Jayade |
| 2015/0154180 A1 | 6/2015 | Trese |
| 2018/0217967 A1 | 8/2018 | Trese et al. |
| 2018/0232346 A1 | 8/2018 | Konnola et al. |
| 2019/0042607 A1 | 2/2019 | Trese et al. |
| 2020/0143107 A1 | 5/2020 | Trese et al. |
| 2022/0147577 A1 | 5/2022 | Trese et al. |
| 2022/0283999 A1 | 9/2022 | Trese et al. |
| 2024/0078217 A1 | 3/2024 | Trese et al. |

OTHER PUBLICATIONS

Pun et al., "Audit Trail Analysis for Traffic Intensive Web Application", 2009, IEEE, 6 pages.
Akkus et al., "Non-Tracking Web Analytics", Oct. 18, 2012, ACM, 12 pages.
Pusara, M., "An Examination of User Behavior for Re-Authentication", Aug. 2007, Center for Education and Research in Information Assurance and Security, Purdue University, 244 pages.
Ishida, "W3C I18n Tutorial: Declaring Language in XHTML and HTML," Oct. 27, 2010, www.w3.org/International/tutorials/language-decl, pp. 1-7.
Jones, Rosie et al., "Beyond the Session Timeout: Automatic Hierarchical Segmentation of Search Topics in Query Logs," CIKM '08, Oct. 26-30, 2008, pp. 699-708.
Ceylan, Hakan et al., "Language Identification of Search Engine Queries," Proceedings of the 47th Annual Meeting fo the ACL and the 4th IJCNLP of the AFNLP, Aug. 2-7, 2009, pp. 1066-1074.
Ghorab, M. Rami et al., "A Framework for Cross-language Search Personalization", IEEE Computer Society, 2009 Fourth International Workshop on Semantic Media Adaptation and Personalization, Dec. 14-15, 2009, pp. 15-20.
Papineni et al., "Bleu: a Method for Automatic Evaluation of Machine Translation", Proc. Of the 40th Annual Meeting of the Association for Computational Linguistics (ACL), Jul. 2002, pp. 311-318.
Shaalan et al., "Machine Translation of English Noun Phrases into Arabic", (2004), vol. 17, No. 2, International Journal of Computer Processing of Oriental Languages, 14 pages.
Isahara et al., "Analysis, Generation and Semantic Representation in CONTRAST—A Context-Based Machine Translation System", 1995, Systems and Computers in Japan, vol. 26, No. 14, pp. 37-53.

* cited by examiner

SYSTEMS AND METHODS OF DOCUMENT REVIEW, MODIFICATION AND PERMISSION-BASED CONTROL

CROSS-REFERENCE TO RELATED DISCLOSURE

This U.S. Nonprovisional patent application is a continuation application of U.S. Nonprovisional patent application Ser. No. 17/584,217, filed Jan. 25, 2022, now granted U.S. Pat. No. 11,775,738 issued on Oct. 3, 2023, entitled "Systems and Methods for Document Review, Display and Validation within a Collaborative Environment," which is a continuation application of U.S. Nonprovisional patent application Ser. No. 16/737,892, filed Jan. 8, 2020, now granted U.S. Pat. No. 11,263,390 issued Mar. 1, 2022, entitled "Systems and Methods for Informational Document Review, Display and Validation," which is a continuation application of U.S. Nonprovisional patent application Ser. No. 15/938,288, filed Mar. 28, 2018, now granted U.S. Pat. No. 10,599,757 issued on Mar. 24, 2020, entitled "Systems, Methods and Media for Controlling the Review of a Document," which in turn is a continuation application of U.S. Nonprovisional patent application Ser. No. 13/217,122, filed Aug. 24, 2011, now granted U.S. Pat. No. 9,984,054, issued on May 29, 2018, entitled "Web Interface Including the Review and Manipulation of a Web Document and Utilizing Permission Based Control." This U.S. Nonprovisional patent application is also related to U.S. patent application Ser. No. 13/037,273 filed on Feb. 28, 2011, now granted U.S. Pat. No. 10,140,320, issued Nov. 27, 2018, and titled "Systems, Methods, and Media for Generating Analytical Data." The disclosures of the aforementioned applications are incorporated by reference herein for all purposes, including all references and appendices cited therein.

FIELD OF THE TECHNOLOGY

The present technology relates generally to controlling the review of documents, and more specifically, but not by way of limitation, to systems, methods, and media for controlling the review of a document, for example, within a collaborative document review environment.

BACKGROUND

Informational documents are often created by document authors for a variety of purposes, such as explication of technical information (e.g., user guides, F.A.Q.s, and so forth). The creation of informational documents is often an iterative and review-intensive process. In many instances, the informational document author(s) may create informational documents in a particular format such as portable document format, a word processing format, or other commonly utilized informational document format.

SUMMARY OF THE TECHNOLOGY

According to some embodiments, the present technology is directed to methods for controlling the review of a document. The methods may include: (a) receiving a request to review a document; (b) responsive to the request, retrieving the document, the document having a read-only access file permission; (c) converting the document to read-write access file permission such that the source content is modifiable; (d) receiving a modification of the source content of the document; and (e) incorporating the modification of the source content into the document to create a modified document.

According to additional embodiments, the present disclosure is directed to systems for controlling the review of a document that may include: (a) a memory for storing executable instructions for controlling review of a document; and (b) a processor configured to execute the instructions, the instructions including: (i) a display module that (1) receives requests to review documents that retrieves the document upon the web-based interface receiving a request to review a document, the document including source content in an extensible markup language format, the document having a read-only access file permission and (2) converts the document to read-write access file permission such that the source content is modifiable; and (ii) a review module communicatively coupled with the display module that (1) receives a modification of the source content of the document; and (2) incorporates the modification of the source content into the document to create a modified document.

According to other embodiments, the present disclosure is directed to non-transitory computer readable storage media having a computer program embodied thereon, the computer program executable by a processor in a computing system to perform a method for controlling review of a document, the method comprising: (a) receiving a request to review a document; (b) responsive to the request, retrieving the document, the document having a read-only access file permission; (c) converting the document to read-write access file permission such that the source content is modifiable; (d) receiving a modification of the source content of the document; and (e) incorporating the modification of the source content into the document to create a modified document.

DETAILED DESCRIPTION OF EXEMPLARY EMBODIMENTS

Figure 1:
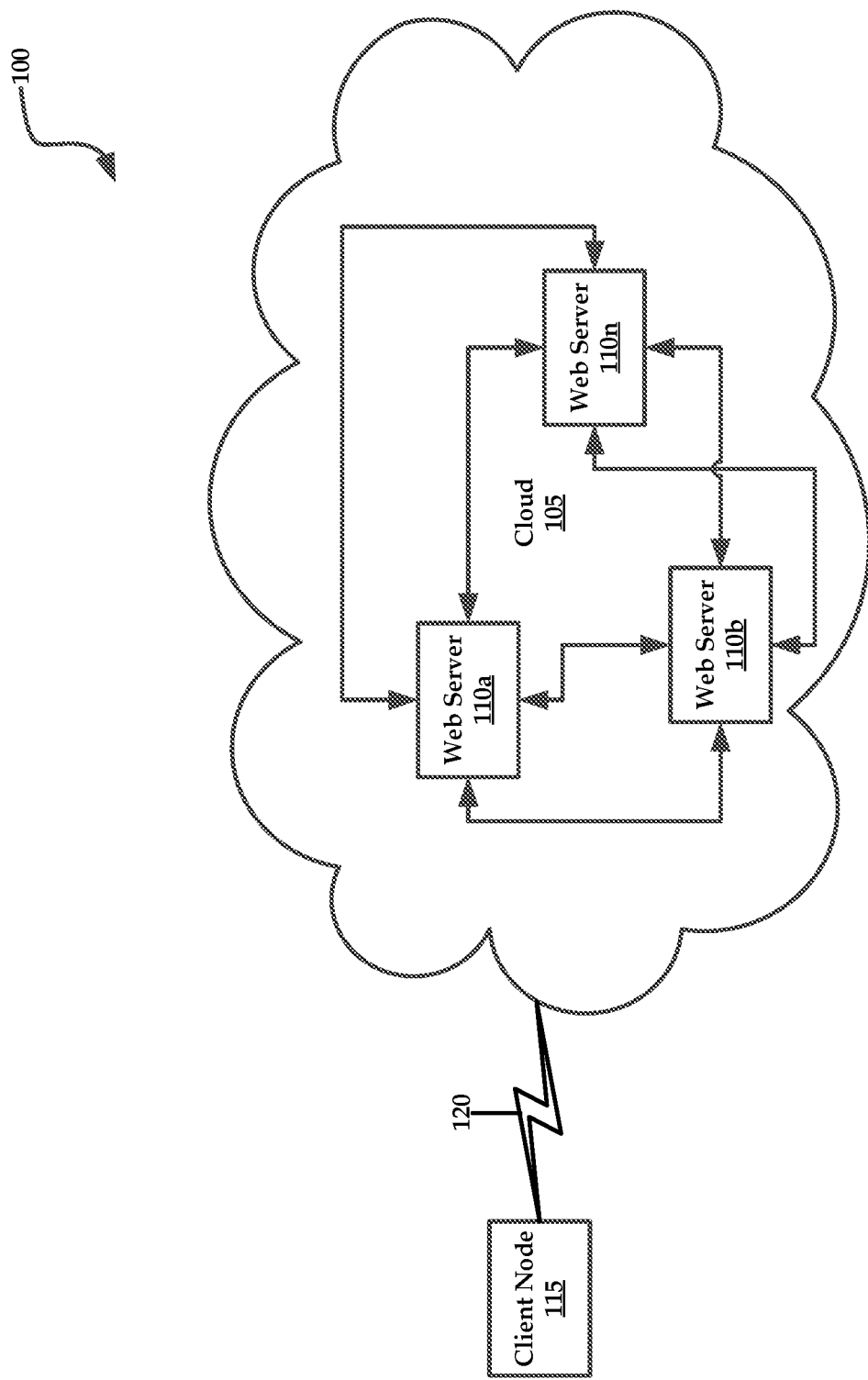
FIG. 1 is a schematic diagram of an exemplary architecture of a system for controlling the review of a document. The system may be utilized to practice aspects of the present technology.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

Unfortunately, document reviewers (those that are tasked with reviewing and modifying these informational documents) may utilize one or more different document rendering and/or editing programs relative to the document author(s) and/or one another. As such, the review process for informational documents becomes cumbersome, as the informational documents must be converted into a plurality of formats. Additionally, some document rendering programs only allow the end user to view, but not modify the informational document. Therefore, any modification to the informational document must be communicated via a program or process external to those utilized to create the informational document. For example, document reviewers often print out a hard copy of the informational document and interlineate or annotate the informational document. The document reviewer must then provide the interlineated document back to the author(s), where the interlineated information can be incorporated into the document.

This process is only further complicated by a collaborative review process where multiple reviewers independently critique or modify the informational documents. Common problems with collaborative review processes stem from many sources. For example, each of the reviewers may not be aware of the modifications to the informational document being created by the other reviewers, leading to duplicative or confusing modifications to the informational content. Additionally, document author(s) may need to review a plurality of versions of the informational document before they can determine if the modifications are potentially erroneous. These time-consuming and cumbersome steps could be eliminated with the use of a centralized and controlled document review process, as described herein Generally speaking, systems and methods provided herein may be configured to control the review of a document. More specifically, systems and methods provided herein may be configured to provide a controlled, collaborative environment for creating, modifying, and reviewing informational documents. According to some embodiments, systems, methods, and media provided herein may be adapted to control the modification of documents within a collaborative review environment.

The systems may be implemented within a cloud-based computing environment and may include a common web-based interface. Individual client nodes may interact with the systems via the web-based interface utilizing a web browser application. In some applications the system includes a review platform having an extensible language markup ("XML") editor that allows individual or multiple client nodes to modify the source content of informational documents.

It will be understood that while some of the embodiments described herein may contemplate the utilization of XML format documents or applications configured to edit or display XML format documents, one of ordinary skill in the art will appreciate that additional types of document formats (e.g., .pdf, .doc, .txt, .html, .aspx, .xls, and so forth) may also likewise be utilized in accordance with the present technology.

Broadly speaking, the review platform may include a what you see is what you get ("WYSIWYG") web-based interface and XML editor that runs in the web browser of a client node, such as an end user computing system. The XML editor allows document reviewers to modify (e.g., edit, save, delete) the source content of informational documents. These informational documents are stored in XML format and may be rendered to display the source content included in the XML structure.

The XML editor provides the document reviewer with an intuitive interface with which to edit the source content of the informational document without requiring document reviewers to understand XML formatting or XML schemas. Therefore, the XML editor may act similarly to commonly utilized word processing applications. Stated otherwise, the XML editor may provide a centralized and easily accessible environment that allows document authors and reviewers to co-own, create, edit, review, and contribute to the creation of informational documents.

The XML editor may also be configured to apply XML schemas or extensible language markup schema definition ("XSD") to the modified source content to ensure that the modifications conform to the XML schema of the document, ensuring that the informational document remains consistently formatted for publishing.

As modifications are received and checked against the XSD, the modified source content may be displayed as it would look if the modified document were to be published as-is. The modifications may be tracked by including them as tentative changes (subject to third party approval), making the modifications visually distinct from the original source content, for example, by coloring, underlining, or other suitable methods. Therefore, modifications to source content may be easily apprehended by other document reviewers or the content author.

In some embodiments, modifications to informational documents may be subject to collaborative review. For example, one or more client nodes may critique the modifications proposed by other client nodes before the modifications are incorporated into the source content of the informational document. In some embodiments, the review platform may utilize collaborative processes such as crowdsourcing to improve and refine the source content of informational documents based upon the collective knowledge of consumers or other end users.

Systems and methods provided herein may substantially reduce the need to convert informational documents into a plurality of document formats (because client nodes may utilize a plurality of different document editing and viewing applications) as the centralized web-based XML editor provides the informational documents in a viewable/editable format that is rendered in the web browser of the client node. Therefore, the review platform may not be constrained by the formatting limitations of third party word processing or document viewing applications or programs.

Referring now to FIG. 1, an architectural diagram of an exemplary system for controlling review of a document is depicted. The system 100 is shown as including a cloud-based computing environment, hereinafter "cloud 105." According to some embodiments, the cloud 105 may include a plurality of interconnected web servers 110a-n.

Individual client nodes 115 are shown communicatively coupled with the cloud 105 via a network 120. It will be understood that the network 120 may include a private or public network such as the Internet.

In general, a cloud-based computing environment is a resource that typically combines the computational power of a large grouping of processors (such as within servers 110a-n) and/or that combines the storage capacity of a large grouping of computer memories or storage devices. For example, systems that provide a cloud resource may be utilized exclusively by their owners, such as Google® or Yahoo!®; or such systems may be accessible to outside users who deploy applications within the computing infrastructure to obtain the benefit of large computational or storage resources.

The cloud may be formed, for example, by a network of web servers 110a-n with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

In some embodiments, the cloud 105 may be configured to provide centralized and controlled environments for creating, modifying, and reviewing informational documents.

Figure 2:
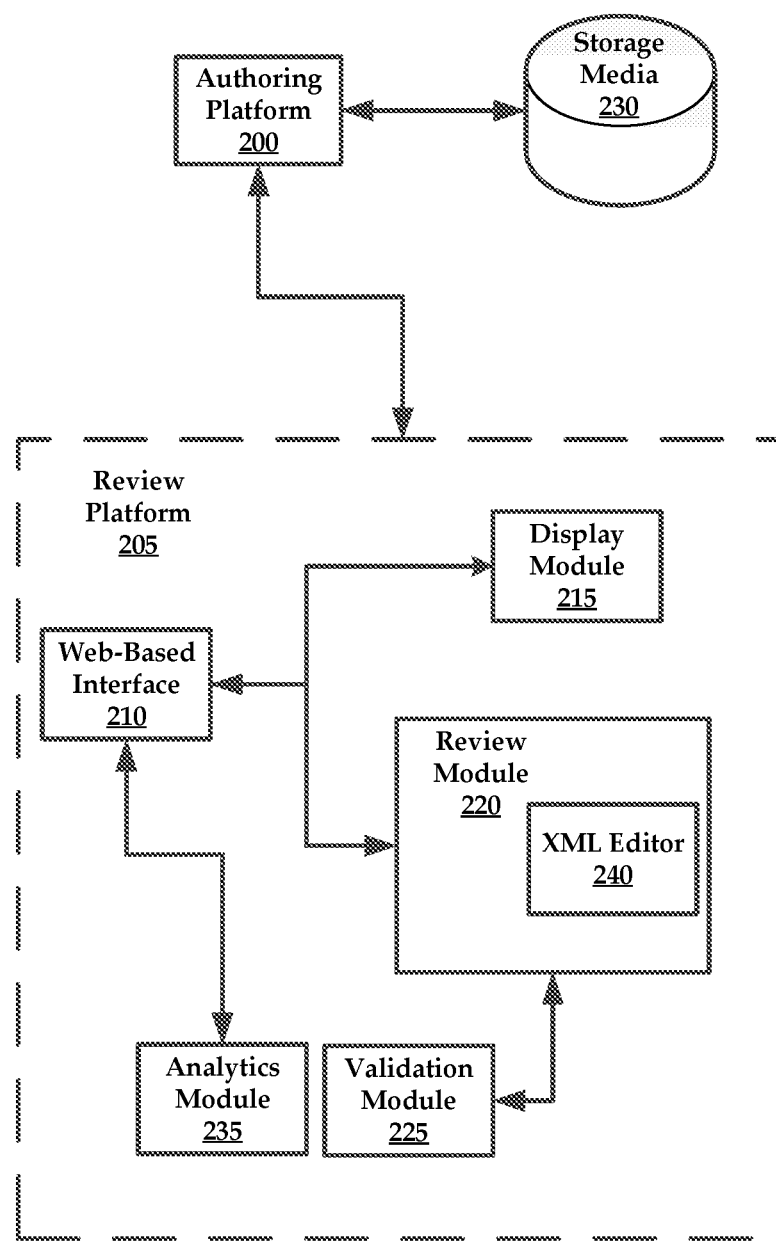
FIG. 2 illustrates an exemplary review platform resident within a cloud-based computing system.

FIG. 2 illustrates an exemplary an authoring platform 200 that is communicatively coupled with a review platform 205 of the cloud 105. In some embodiments, the review platform 205 may include a web-based interface 210, a display module 215, a review module 220, and a validation module 225.

It is noteworthy that the review platform 205 may include additional modules, engines, or components, and still fall within the scope of the present technology. As used herein, the term "module" may also refer to any of an application-specific integrated circuit (ASIC), an electronic circuit, a processor (shared, dedicated, or group) that executes one or more software or firmware programs, a combinational logic circuit, and/or other suitable components that provide the described functionality. In other embodiments, individual modules of the review platform 205 may include separately configured web servers.

The authoring platform 200 may provide an additional platform for document authors to manage, edit, and release content for publishing to the display module 215. As such, the authoring platform 200 may be communicatively coupled with a storage media 230 that receives and retains informational documents created by document authors.

It will be understood the informational documents stored within the storage media may have a read-only file access permission to prevent unwanted changes to the documents. Once documents are created and made available for review, content authors may notify document reviewers that one or more informational documents are available for review via electronic mail or other methods.

It is noteworthy that the timelines on which the reviews are opened and closed by content authors, and the type of document reviewer(s) who are allowed to perform various review functions may vary. For example, document authors may specify single day review periods, always open review periods, subject-matter experts from within engineering to the open community on the web, and so forth.

To review a document, document reviewers may communicatively couple to the review platform 205 via the web-based interface 210 utilizing a client node 115. The web-based interface 210 allows document reviewers to interact with and/or review informational documents. Document reviewers may select informational documents, or portions of informational documents to review via the web-based interface 210. Selecting informational content via the web-based interface 210 generates a request that is passed to the authoring platform 200.

The authoring platform 200 may then publish the informational document to the web-based interface via the display module 215. Next, the web browser of the client node 115 renders the source content of the informational document in a format that is perceivable to the document reviewer.

It is noteworthy that although the display module 215 and the review module 220 have been disclosed as being two separate modules, the inclusion of the web-based interface 210 ensures a tight integration of the functionalities of the two modules together. Therefore, when the document reviewer accesses a document via the web-based interface 210, the display module 215 and review module 220 work together in a seamless fashion to provide a review platform that resembles a conventional word processing application.

Additionally, the display module 215 may provide the document reviewer with powerful search capabilities. For example document reviewers may search for documents with simple searches to advance searches, or may search for specific content utilizing specific fields (e.g., image titles, and so forth). Additionally, the display module 215 may allow document authors to personalize their searches. For example, document reviewers may have the ability to filter down the searched documents based on a set of user-defined or otherwise provided criteria that allows the document reviewers to see only the documents they need.

Additionally, the display module 215 may function as a simple, easy-to-read, easy-to-navigate, and inter-linked search tool. In other embodiments, documents may be browsed by keywords, index terms, or other types of navigational structures. In some applications, the display module 215 may include graphic and media rich aids that make it easier for document reviewers to use, understand, and utilize the review platform 205.

The display module 215 receives the informational document from the authoring platform 200 in read-write access file permission such that modifications may be made to the informational document. Modifications to the document may be received by the review module 220 from input received via the web-based interface 210. According to some embodiments, the review module 220 may include an XML editor 240 that functions similarly to a word processing application. Document reviewers may utilize the XML editor 240 without need to learn the intricacies of the XML language or an appreciation of the XML structure or schema. Therefore, the informational content does not need to be converted into a suitable document format that may be different from the document format of the original informational document.

In some embodiments, the review module 220 may include a simple, easy-to-read, and easy-to-navigate modification form that appears substantially the same as the read-only version of the document. Similarly to the display module 215, the review module 220 (or XML editor 240) may include rich media and graphical aids that make it easier for an administrator or any other person tasked with configuring the system to understand and utilize the XML editor 240. Additionally, such individuals may be allowed to configure how the XML editor 240 behaves. For example, such individuals may configure the XML editor 240 such that hitting enter in a paragraph creates a new paragraph within the document. In another example, hitting enter in a list creates a new list item—but hitting enter twice may end the list and define the beginning of a new paragraph.

For example, if the original informational document is created in XML format, the system does not need to convert the XML format document into more commonly utilized document formats such as portable document format ("PDF"), document format ("DOC"), and so forth. Informational documents that are rendered by the web-based interface 210 may appear as a conventional word processing document instead of the more complicated and abstract native XML format that was utilized by the document author.

According to some embodiments, document reviewers may be provided document review templates that provide the document reviewer with a limited subset of review functionalities based upon the technical sophistication of individual document reviewers. For example, a document reviewer having very little knowledge of the technical aspects of XML content (such as, e.g., a marketing professional perhaps) may be provided with a very simplified XML editor that looks very similar to a word processing program. More sophisticated reviewers (such as, e.g., computer programmers) may be provided with a more technical and granular interface that allows the reviewer to comment or review pseudo-code, or even the underlying source code itself. As such, the web-based interface 210 may advantageously be tailored to the sophistication level of the end user.

Modifications made to the source content of the informational document via the XML editor 240 may be evaluated by a validation module 225 before the modifications are incorporated into the informational document. In some embodiments, the validation module 225 may apply a XSD schema to the modifications to determine if the modifications conform to the XSD schema. If the modifications do not conform to the XSD schema, they may be rejected. The review module 220 may generate a warning that is displayed to the document reviewer that the proposed modification does not conform to the XSD schema. One of ordinary skill in the art with the present disclosure before them will appreciate that many types of XML schema may likewise be utilized in accordance with the present technology.

Assuming the modifications conform to the XSD schema of the informational document, the modifications may be incorporated into the document to create a modified document. Once modifications have been incorporated into the original document, the modified document becomes the original document for purposes of a subsequent review. That is, the modified document may take the place of the original document. This process may happen iteratively as the document is further reviewed and modified over time.

In some embodiments the modifications may be saved temporarily as tentative changes. These tentative changes may be represented in a visually distinct manner relative to the original source content of the informational document. For example, the modifications may be underlined or colored such that they may be quickly and easily visually apprehended by a document reviewer. Tentative changes may be incorporated into the document upon approval, as discussed in greater detail herein.

In other embodiments, modifications are incorporated without further review. As such, upon a modification being incorporated into the document, the display module 215 may provide or "publish" the updated document to the web-based interface 210 such that the document reviewer may immediately or instantaneously review the modification. This instantaneous, or essentially instantaneous, feedback provides the document reviewer with a visual representation of the incorporation of a modification to the informational document. As such, the document reviewer may more easily appreciate the effect of a particular modification on the final published appearance of the informational document by reviewing the feedback.

It is envisioned that the document author may provide an informational document to a plurality of document reviewers. The document reviewers may collaboratively review the document, each independently (or collaboratively) providing modifications or commentary relative to the informational document.

In some applications, document reviewers may be the actual document consumer or end user. Document authors may publish the informational document for review by a plurality of end users in a collaborative review process that is often referred to as "crowdsourcing." Rather than (or in addition to) utilizing resources within a company to review technical or informational documents, content authors may enlist the expertise of their customers to refine and improve the informational documents of the company. Because the end user may utilize the web-based interface 210 to provide commentary or review an informational document, web analytics may be gathered from the client device of the end user that communicatively couples with the web-based interface 210. These web analytics may be utilized to help the company or other entity to understand the demographics or interest of their end users, providing additional benefit to both the end user and the company or entity. Web analytics may be aggregated and evaluated according to methods such as those disclosed in a corresponding U.S. patent application Ser. No. 13/037,273 filed on Feb. 28, 2011 and titled "Systems, Methods, and Media for Generating Analytical Data," which is hereby incorporated herein by reference in its entirety including all references cited therein.

The web-based interface 210 may receive modifications from each of the plurality of document reviewers and may incorporate modifications to the document in different colors. Each color may be associated with a different document reviewer. Additionally, document reviewers may critique or comment on the modifications of other document reviewers. It will be understood that these types of review processes may be utilized to determine inconsistencies in informational documents, or may be utilized as a quality control process.

In some exemplary embodiments, consensus regarding modifications may be obtained from the plurality of document reviewers before the modifications may be incorporated into the document. In some instances, a subset of document reviewers may be utilized to filter or approve modifications. In other embodiments, document reviewers may be permitted to vote on the appropriateness of a modification before incorporation of the same into the document to create a modified document.

In short, the review platform 205 may provide mechanisms for dynamic document review processes that are controlled (only allowing a document to have its file access permission changed to read-write upon request from an approved document reviewer) and allows for collaborative review.

In other embodiments, document authors may approve or reject modifications to the document. In these embodiments, the document author may utilize the web-based interface 210 and select one or more of the modifications. The document author may accept or reject the modifications. Accepted modifications may be incorporated into the document to create a modified document.

It will be understood that document reviewers may be granted privileges within the review platform 205 by the system administrators and/or document authors. These privileges may be determined by department (document authors v. engineers) or as a document review project moves through different stages. For example, such stages may include "open review" stages where engineers modify the source content, and "closed review" stages where only document authors may review and/or modify informational documents.

In some embodiments, the review platform 205 may include an analytics module 235 that may track the behavior of document reviewers to determine metrics such as informational documents with the highest number of modifications (connotes poorly authored documents or confusing source content), what types of modifications are being made to documents, how different communities of document reviewers modify documents, and so forth. Reports or other statistical data may be provided to content authors via the analytics module 235.

As stated previously, the review platform 205 may be adapted to associate modifications or commentary with individual document reviewers. As such, by clicking on (or otherwise selecting) the modification or comment, a document author (or other document reviewer) may determine information corresponding to the individual (or individuals) that provided the comment or modification. The information corresponding to the individual may include a name, an email address, social media identification, or other identifying information that allows the individual document reviewer to be contacted directly for more immediate feedback. Individual comments or modifications may be tagged with information that corresponds to the document reviewer that provided the commentary or modification.

In some applications, the review module 205 may be configured to retain a breadcrumb trail, thread, or other similar comment artifact of each change made to the informational document, or commentary relating to the document. An exemplary breadcrumb trail may include a navigation aid that visually portrays iterations of the document. For example, the dates of modifications may be listed in chronological order with a glyph (symbol) between adjacent dates. Historical information may assist the document author in creating documents that are more closely aligned with the interests or desires of the document consumer.

Document authors or document reviewers may be allowed to close individual comment threads or feedback loops to resolve particular issues relative to a document. As such, the analytics module 235 of the review platform 205 may also monitor the status of review, commentary, or critiques of documents to determine outstanding issues relative to a document (e.g., issues that have not been closed). For example, several document reviewers may have questioned the use of a particular phrase within a document. In some illustrative embodiments, if the content author has not responded to the commentary, it may be assumed that the document reviewer is not considering the commentary, or is not responding to issues in a timely manner. According to some embodiments, the analytics module 235 may generate graphs or charts of issues or critiques that have been opened, closed, reviewed, and so forth, within a particular period of time.

In summation, the flow of data begins when a request for a document is received by the review platform, namely by the display module 215. Documents corresponding to the request are obtained from the authoring platform 200 by the display module 215. Before the documents are communicated from the authoring platform 200 to the display module 215, the authoring platform 200 converts the document from read-only file access permission to read-write access file permission.

The display module communicates the document to the review platform 220. Modifications are received by, and incorporated into the document via the review platform 220. To be sure, modifications may include edits, comments, changes, or other similar data. The review platform 220 updates the document with the modifications to create a modified document. The review platform 220 then communicates the modified document back to the display module 215 where the modified document may be provided in a displayable format or communicated back to the authoring platform 200.

After receiving the modified document from the display module 215, the authoring platform 200 then converts the modified document back to read-only file access permission before storing in a storage media.

Figure 3:
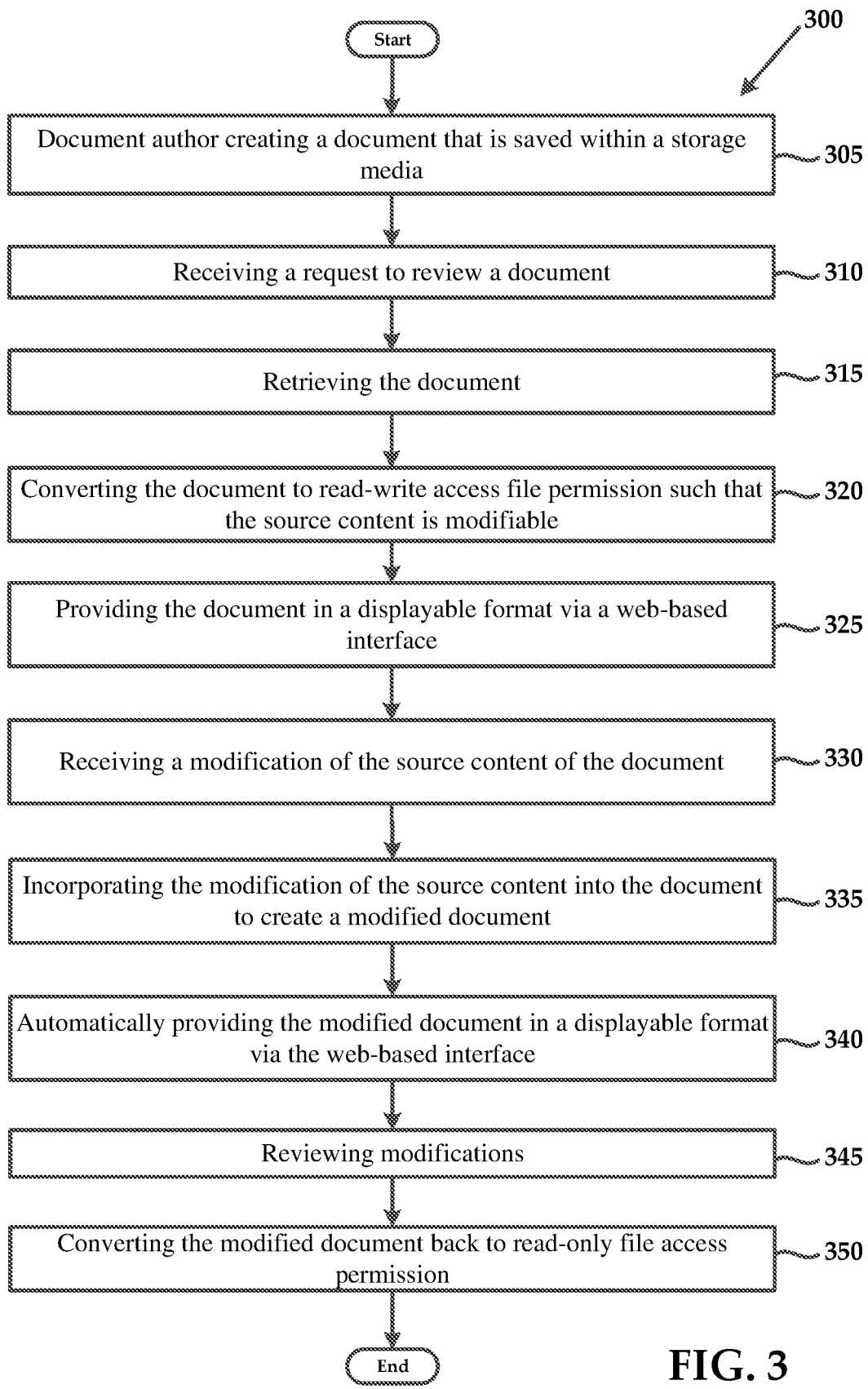
FIG. 3 is an exemplary flowchart of a method for controlling the review of a document.

In keeping with some embodiments according to the present technology, FIG. 3 illustrates a flowchart of an exemplary method 300 for controlling the review of a document. The method 300 may begin with a step 305 of a document author creating a document that is saved within a storage media. It will be understood that the document may be saved having a read-only file access permission to prevent unwanted changes to the document. It will further be understood that the document has a XML format, in this example, and includes source content that defines the subject matter of the document. Moreover, the document remains in XML format during each step of the method from storage to display to modification and finally back to storage. As such, this exemplary method advantageously allows for review and modification of documents without the need to convert the document into discrepant formats.

The method may include the step 310 of receiving a request to review a document from a client node via the web-based interface. The request may be generated from a document reviewer selecting a document, or a portion of a document.

Next, responsive to the request, the method may include the step 315 of retrieving the document from the storage media. It is noteworthy that the storage media may be communicatively coupled with (or reside within) a cloud-based computing system.

After retrieval, the method may include the step 320 of converting the document to read-write access file permission such that the source content is modifiable, along with a step 325 of providing the document in a displayable format via a web-based interface.

The converting of the document to read-write access file permission functions similarly to opening a document in a word processing application, in some embodiments. Advantageously, the document reviewer may comment, edit, delete, add, or otherwise modify the source content of the document all without the need to understand the intricacies and code structure of the XML document format.

If the document reviewer modifies the document, the method may include a step 330 of receiving a modification of the source content of the document and a step 335 of incorporating the modification of the source content into the document to create a modified document.

Because the platform provided herein may utilize WYSIWYG processes for document review, the method 300 may include the step 340 of automatically providing the modified document in a displayable format via the web-based interface. Feedback or modifications to the document are made immediately available to the document reviewer. In some methods, modifications may be displayed in a visually distinct format by underlining and/or coloring the modifications to delineate them from the original source content of the document.

According to some embodiments, the method 300 may include a step 345 of reviewing modifications before the modified or reviewed document is converted back to read-only file access permission. The step 345 of reviewing modifications may be performed by the original document author, the document reviewer, a plurality of document reviewers, or via crowdsourcing. Reviewing modifications may include approving or rejecting modifications to the document, in whole or in part. It will be understood that the step 345 of reviewing modifications may occur before the step 335 of incorporating the modification of the source content into the document to create a modified document.

Once the modified document has been reviewed the method 300 may include a step 350 of converting the modified document back to read-only file access permission. The modified document may again be stored in the storage media associated with the cloud-based computing system.

Figure 4:
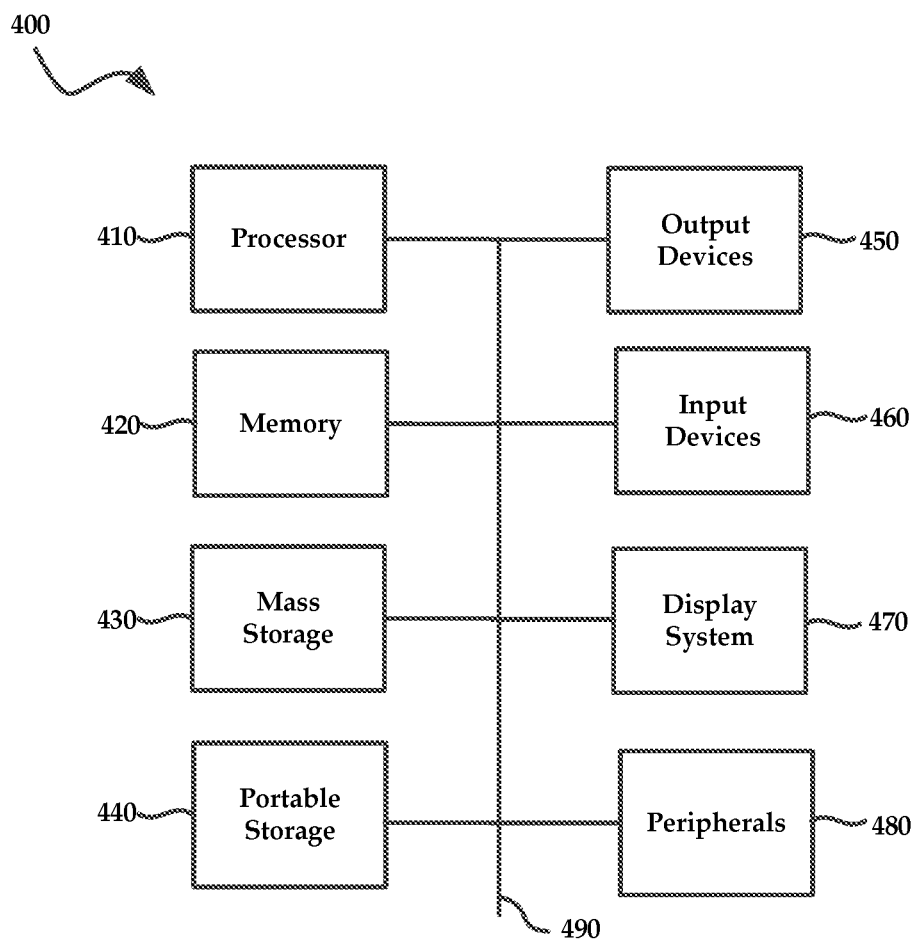
FIG. 4 is a block diagram of an exemplary computing system that may be utilized to practice aspects of the present disclosure.

FIG. 4 illustrates an exemplary computing system 400 that may be used to implement an embodiment of the present technology. The computing system 400 of FIG. 4 includes one or more processors 410 and main memory 420. Main memory 420 stores, in part, instructions and data for execution by processor 410. Main memory 420 can store the executable code when the system 400 is in operation. The system 400 of FIG. 4 may further include a mass storage device 430, portable storage 440, output devices 450, user input devices 460, a graphics display 440, and other peripherals 480.

The components shown in FIG. 4 are depicted as being connected via a single bus 490. The components may be connected through one or more data transport means. Processor 410 and main memory 420 may be connected via a local microprocessor bus, and the mass storage device 430, peripherals 480, portable storage device 440, and display system 470 may be connected via one or more input/output (I/O) buses.

Mass storage device 430, which may be implemented with a magnetic disk drive or an optical disk drive, is a non-volatile storage device for storing data and instructions for use by processor 410. Mass storage device 430 can store the system software for implementing embodiments of the present technology for purposes of loading that software into main memory 420.

Portable storage device 440 operates in conjunction with a portable non-volatile storage media, such as a floppy disk, compact disk or Digital Video Disc, to input and output data and code to and from the computing system 400 of FIG. 4. The system software for implementing embodiments of the present technology may be stored on such a portable media and input to the computer system 400 via the portable storage device 440.

Input devices 460 provide a portion of a user interface. Input devices 460 may include an alphanumeric keypad, such as a keyboard, for inputting alphanumeric and other information, or a pointing device, such as a mouse, a trackball, stylus, or cursor direction keys. Additionally, the system 400 as shown in FIG. 4 includes output devices 450. Suitable output devices include speakers, printers, network interfaces, and monitors.

Display system 470 may include a liquid crystal display (LCD) or other suitable display device. Display system 470 receives textual and graphical information, and processes the information for output to the display device.

Peripherals 480 may include any type of computer support device to add additional functionality to the computer system. Peripherals 480 may include a modem or a router.

The components contained in the computer system 400 of FIG. 4 are those typically found in computer systems that may be suitable for use with embodiments of the present technology and are intended to represent a broad category of such computer components that are well known in the art. Thus, the computer system 400 of FIG. 4 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable media). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage media" and "computer-readable storage media" as used herein refer to any media or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic media, a CD-ROM disk, digital video disc (DVD), any other optical media, any other physical media with patterns of marks or holes, a RAM, a PROM, an EPROM, an EEPROM, a FLASHEPROM, any other memory chip or data exchange adapter, a carrier wave, or any other media from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

It is noteworthy that various modules and engines may be located in different places in various embodiments. Modules and engines mentioned herein can be stored as software, firmware, hardware, as a combination, or in various other ways. It is contemplated that various modules and engines can be removed or included in other suitable locations besides those locations specifically disclosed herein. In various embodiments, additional modules and engines can be included in the exemplary embodiments described herein.

The above description is illustrative and not restrictive. Many variations of the technology will become apparent to those of skill in the art upon review of this disclosure. The scope of the technology should, therefore, be determined not with reference to the above description, but instead should be determined with reference to the appended claims along with their full scope of equivalents.

What is claimed is:

1. A method, comprising:
   receiving, via a web-based interface, a request to review a document;
   responsive to the request, retrieving the document from a storage media of a cloud-based computing environment, the document having a read-only access file permission;

converting the document to read-write access file permission such that a source content of the document is modifiable while maintaining extensible markup language format integrity;
generating individualized document review templates that provide different subsets of review functionalities based upon detected technical sophistication levels of document reviewers;
receiving, via a web-based extensible markup language editor that provides word processing functionality without exposing extensible markup language formatting, two or more modifications of the source content of the document from two or more users;
validating the two or more modifications by applying extensible markup language schemas to ensure schema conformity while maintaining document format consistency;
incorporating the two or more modifications of the source content into the document to create a modified document upon receiving a threshold level of consensus from authorized document reviewers;
creating a navigation aid that visually portrays iterations of the document from the two or more modifications that are listed in chronological order with a glyph between dates of the two or more modifications, each modification is displayed in a different color corresponding to different document reviewers;
providing the modified document such that a document reviewer may immediately or instantaneously review the two or more modifications of the source content being incorporated into the document; and
automatically converting the modified document back to read-only file access permission while maintaining the extensible markup language format integrity.

2. The method of claim 1, wherein validating the two or more modifications comprises:
generating a warning that is displayed to document reviewers when modifications do not conform to the extensible markup language schemas; and preventing incorporation of non-conforming modifications into the document.

3. The method of claim 1, wherein the individualized document review templates comprise: a simplified interface resembling a word processing program for reviewers with limited technical knowledge; and a technical interface allowing direct interaction with underlying source code for technically sophisticated reviewers.

4. The method of claim 1, further comprising: tracking reviewer behavior to determine: documents receiving highest numbers of modifications; types of modifications being made; and modification patterns across different reviewer communities.

5. The method of claim 1, further comprising generating a real-time visual overlay by: associating each modification with reviewer identification information; and enabling direct contact with reviewers by selecting associated modifications.

6. The method of claim 1, further comprising: gathering web analytics from client devices that access the web-based interface; and evaluating the web analytics to determine demographics and interests of document reviewers.

7. A method for secure collaborative document review within a cloud-based computing environment, the method comprising:
establishing secure communication channels between multiple client nodes and a centralized review platform;
receiving, via the secure communication channels, requests from client nodes to review a document;
retrieving the document from an authoring platform, the document having read-only file access permission;
automatically converting the document to read-write access file permission while preserving extensible markup language formatting;
generating role-based review interfaces that provide different levels of document access based on reviewer credentials;
receiving concurrent modifications from multiple client nodes through role-appropriate interfaces;
maintaining modification integrity by:
tracking each modification's source and timestamp;
validating schema compliance for each modification;
displaying concurrent modifications with visual differentiation; and
preventing conflicting modifications through real-time conflict detection;
creating an auditable modification history that chronicles all changes with reviewer attribution; and
securing a modified document by restoring read-only file access permission.

8. The method of claim 7, wherein each of the role-based review interfaces comprise: interfaces for marketing professionals that resemble word processing programs; and technical interfaces for computer programmers that expose underlying source code.

9. The method of claim 7, further comprising: tracking status of modifications and critiques to determine outstanding document issues; and generating statistical reports of opened, closed, and reviewed issues within specified time periods.

10. The method of claim 7, wherein maintaining modification integrity further comprises: enabling document reviewers to close individual comment threads; and monitoring response times to commentary and critiques.

11. The method of claim 7, further comprising: enabling document authors to specify review period durations; and controlling reviewer access based on specified review periods.

12. The method of claim 7, wherein the role-appropriate interfaces are determined by department designation and document review project stage.

13. A system for secure collaborative document review, comprising:
a cloud-based computing environment including distributed storage media maintaining documents with read-only file access permission;
an authoring platform managing document access permissions; and
a review platform comprising:
a security module that authenticates document reviewers and manages role-based access;
a display module that:
retrieves documents while preserving format integrity;
converts documents between read-only and read-write permissions; and
generates role-specific review interfaces;
a collaborative review module comprising:
a schema-aware extensible markup language (XML) editor that: enables concurrent modifications from multiple reviewers; validates modifications against XML schemas in real-time; prevents schema-breaking modifications; and maintains document format integrity; and a visual differentiation engine that: displays concurrent modifications with reviewer-specific highlighting; tracks modification sources and timestamps; and prevents conflicting modifications; and a validation module that: enforces modification consensus requirements; maintains an auditable modification history; and ensures secure permission restoration.

14. The system of claim 13, wherein the collaborative review module further: enables the document reviewers to search for documents using personalized filtering criteria; and provides graphic and media-rich navigation aids.

15. The system of claim 13, wherein the visual differentiation engine: displays tentative changes in visually distinctive formats until approved; maintains modification tracking through review iterations; and preserves original document content during review.

16. The system of claim 13, wherein the validation module: evaluates modifications against extensible markup language schema definitions; rejects non-conforming modifications; and generates warnings for schema violations.

17. The system of claim 13, wherein the security module: manages review privileges based on department designation; controls access during different review stages; and authenticates reviewer credentials before granting document access.

18. The system of claim 13, wherein the display module: renders documents in browser-compatible formats; preserves document formatting across multiple viewing platforms; and provides real-time display updates when modifications are made.

19. The system of claim 13, wherein the schema-aware XML editor: functions similarly to commonly used word processing applications; shields reviewers from underlying XML complexity; and maintains consistent document formatting for publishing.

20. The system of claim 13, wherein the review platform further comprises: an analytics module that: tracks reviewer behavior patterns; generates modification statistics; and provides insight into document quality based on modification volumes and types.

* * * * *